US012607359B2

(12) United States Patent
Ito et al.

(10) Patent No.: US 12,607,359 B2
(45) Date of Patent: Apr. 21, 2026

(54) COMBUSTOR AND GAS TURBINE

(71) Applicant: IHI Corporation, Tokyo (JP)

(72) Inventors: Shintaro Ito, Tokyo (JP); Soichiro Kato, Tokyo (JP)

(73) Assignee: IHI CORPORATION, Tokyo (JP)

( * ) Notice: Subject to any disclaimer, the term of this patent is extended or adjusted under 35 U.S.C. 154(b) by 8 days.

(21) Appl. No.: 18/805,839

(22) Filed: Aug. 15, 2024

(65) Prior Publication Data

US 2024/0410584 A1     Dec. 12, 2024

Related U.S. Application Data

(63) Continuation of application No. PCT/JP2022/042909, filed on Nov. 18, 2022.

(30) Foreign Application Priority Data

Feb. 25, 2022     (JP) ................................. 2022-028404

(51) Int. Cl.
| | |
|---|---|
| *F23R 3/34* | (2006.01) |
| *F02C 7/228* | (2006.01) |
| *F02C 9/40* | (2006.01) |
| *F23R 3/36* | (2006.01) |

(52) U.S. Cl.
CPC .............. *F23R 3/343* (2013.01); *F02C 7/228* (2013.01); *F02C 9/40* (2013.01); *F23R 3/36* (2013.01)

(58) Field of Classification Search
CPC .. F23R 3/34; F23R 3/343; F23R 3/346; F23R 3/36; F23R 3/48; F02C 3/22; F02C 7/228; F02C 7/26; F02C 7/264; F02C 9/40; F02C 9/34
See application file for complete search history.

(56) References Cited

U.S. PATENT DOCUMENTS

| | | | |
|---|---|---|---|
| 5,311,742 A | 5/1994 | Izumi et al. | |
| 2009/0118973 A1 | 5/2009 | Gillespie et al. | |
| 2009/0126367 A1* | 5/2009 | Chhabra | ................. F02C 7/228 |
| | | | 60/734 |
| 2011/0100018 A1* | 5/2011 | Nakamura | .............. F23N 1/002 |
| | | | 60/776 |
| 2013/0230432 A1 | 9/2013 | Williams et al. | |

(Continued)

FOREIGN PATENT DOCUMENTS

| | | |
|---|---|---|
| JP | S59-004823 A | 1/1984 |
| JP | H05-149149 A | 6/1993 |
| JP | 2010-019195 A | 1/2010 |

(Continued)

*Primary Examiner* — Gerald L Sung
*Assistant Examiner* — Jingchen Liu

(57)     ABSTRACT

A combustor includes: a plurality of burners supplied with ammonia and a second fuel; and a controller. The controller is configured to execute: supplying the second fuel to at least a first burner among the plurality of burners in a first load range including zero load; and, in a second load range where an equivalent ratio of the first burner reaches a predetermined first value, increasing a flow rate of ammonia and decreasing a flow rate of the second fuel for the first burner so that the total equivalent ratio of ammonia and the second fuel of the first burner is maintained at the first value, and supplying excess second fuel that is not supplied to the first burner to a second burner.

3 Claims, 4 Drawing Sheets

(56)         References Cited

U.S. PATENT DOCUMENTS

2020/0392908 A1* 12/2020 Yunoki ..................... F02C 9/28

FOREIGN PATENT DOCUMENTS

| JP | 2012-141078 | A | 7/2012 |
| JP | 2014-500942 | A | 1/2014 |
| JP | 2020-139691 | A | 9/2020 |
| JP | 2020-139699 | A | 9/2020 |

* cited by examiner

COMBUSTOR AND GAS TURBINE

CROSS REFERENCE TO RELATED APPLICATIONS

This application is a continuation application of International Application No. PCT/JP2022/042909, filed on Nov. 18, 2022, which claims priority to Japanese Patent Application No. 2022-028404 filed on Feb. 25, 2022, the entire contents of which are incorporated by reference herein.

BACKGROUND ART

Technical Field

The present disclosure relates to a combustor and a gas turbine.

Conventionally, a combustor that uses ammonia as fuel has been known. The combustibility of ammonia is known to be poor. For example, Patent Literature 1 discloses a gas turbine that uses ammonia with another fuel to address this issue. This gas turbine increases the ratio of another fuel in an operating region where ammonia has poor combustibility.

CITATION LIST

Patent Literature

Patent Literature 1: JP 2010-19195 A

SUMMARY

Technical Problem

A combustor using ammonia may use a two-stage combustion method. In such a combustor, it is known that occurrences of both NOx and unburned ammonia can be reduced while using ammonia as fuel by burning ammonia at an equivalent ratio within a certain range in the first stage. Note that the "equivalent ratio" is an index of concentration of fuel in an air-fuel mixture, and is a value obtained by dividing the stoichiometric air-fuel ratio, which means an air-fuel ratio at which fuel and oxygen in the air-fuel mixture react without excess or deficiency, by an actual air-fuel ratio. However, a flow rate of air in a combustor may be substantially constant according to the area of openings in the combustor (e.g., the area of openings such as air holes). Accordingly, when a flow rate of fuel varies depending on a required load, the equivalent ratio of the fuel also varies. As such, in a certain load range, ammonia may not be burned at the equivalent ratio within the above certain range. In this case, occurrences of both NOx and unburned ammonia may not be reduced.

The purpose of the present disclosure is to provide a combustor and a gas turbine that can reduce occurrences of both NOx and unburned ammonia while using ammonia as fuel over a wider load range.

Solution to Problem

A combustor in accordance with an aspect of the present disclosure includes: a plurality of burners, each of which is supplied with ammonia as a first fuel and a second fuel that does not contain N atoms and has better ignitability than that of ammonia; and a controller that adjusts a flow rate of ammonia and a flow rate of the second fuel to the plurality of burners, the controller being configured to execute: supplying the second fuel to at least a first burner among the plurality of burners in a first load range including zero load; and, in a second load range where an equivalent ratio of the first burner reaches a predetermined first value, increasing the flow rate of ammonia and decreasing the flow rate of the second fuel for the first burner so that the total equivalent ratio of ammonia and the second fuel of the first burner is maintained at the first value, and supplying excess second fuel that is not supplied to the first burner to a second burner.

The controller may be configured to execute: in a third load range where the flow rate of ammonia for the first burner reaches a predetermined second value, increasing the flow rate of ammonia and decreasing the flow rate of the second fuel for the second burner, an equivalent ratio of which has reached the first value, so that the total equivalent ratio of ammonia and the second fuel of the second burner is maintained at the first value.

Another aspect of the present disclosure is a gas turbine including the combustor described above.

Effects

According to the present disclosure, occurrences of both NOx and unburned ammonia can be reduced while using ammonia as fuel over a wider load range.

DESCRIPTION OF EMBODIMENTS

An embodiment of the present disclosure will be described in detail below with reference to the accompanying drawings. Specific dimensions, materials, and numerical values described in the embodiments are merely examples for a better understanding, and do not limit the present disclosure unless otherwise specified. In the present specification and the drawings, duplicate explanations are omitted for elements having substantially the same functions and configurations by assigning the same sign. Furthermore, elements not directly related to the present disclosure are omitted from the figures.

Figure 1:
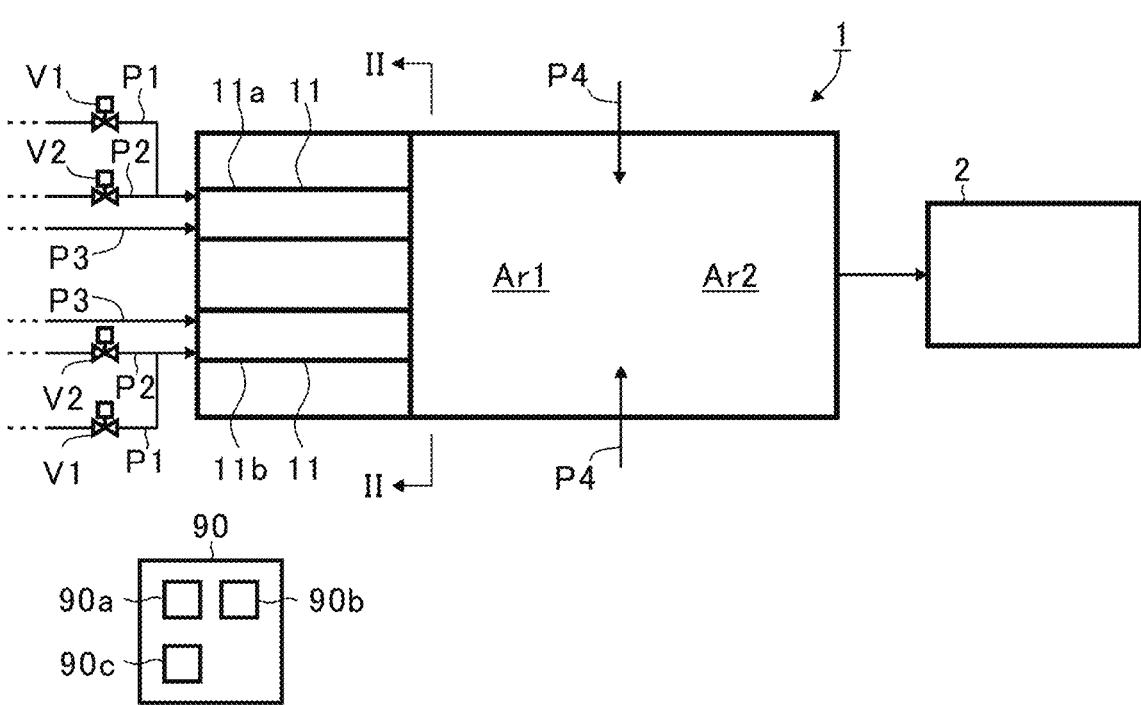
FIG. 1 is a schematic diagram of a gas turbine according to an embodiment.
Figure 2:
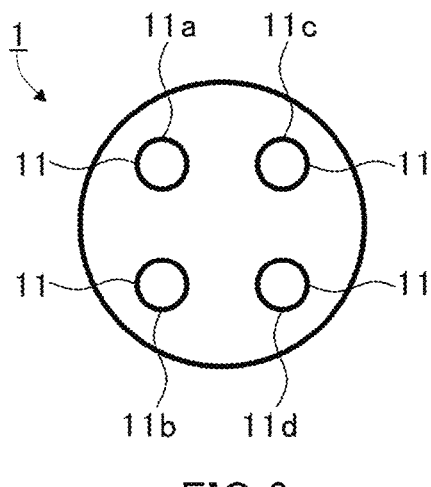
FIG. 2 is a cross-sectional view taken along line II-II in FIG. 1.

FIG. 1 is a schematic diagram of a gas turbine 100 according to an embodiment. FIG. 2 is a cross-sectional view taken along line II-II in FIG. 1, and it is a schematic cross-sectional view showing a combustor 1. Referring to FIG. 1, the gas turbine 100 comprises the combustor 1, a turbine 2, and a controller 90. The gas turbine 100 may further comprise other components. In another embodiment, the combustor 1 may be used in another device other than the gas turbine 100. For example, the combustor 1 may be used in a device such as a jet engine or an industrial furnace.

In the present embodiment, the combustor 1 uses a two-stage combustion method, and includes a first stage Ar1 and a second stage Ar2. The combustor 1 uses fuels including ammonia as a first fuel, and a second fuel that does not contain N atoms and has a better ignitability than that of ammonia. The second fuel may be, for example, natural gas, hydrogen or kerosene, or a combination thereof. The second fuel is not limited thereto, and may be other fuels.

Referring to FIG. 2, the combustor 1 includes a plurality of burners 11. In the present embodiment, the combustor 1 includes four burners 11, i.e., a first burner 11a, a second burner 11b, a third burner 11c, and a fourth burner 11d. However, the number of burners 11 is not limited thereto, and may be two, three, or five or more. For example, the plurality of burners 11 may be arranged in any pattern, such as annular shapes having substantially the same central axis, a matrix, or a circle.

Referring to FIG. 1, each burner 11 receives supplies of ammonia as fuel and a second fuel. Each burner 11 is connected to piping P1 configured to supply ammonia and piping P2 configured to supply the second fuel. At least one of the plurality of burners 11 may not receive a supply of ammonia, for example, the fourth burner 11d that does not actually use ammonia as described later. In this case, the fourth burner 11d may not be connected to the piping P1. Although the piping P1 and the piping P2 join each other in FIG. 1, the piping P1 and the piping P2 do not have to join each other and may each be directly connected to the burner 11. Furthermore, each burner 11 is connected to piping P3 configured to supply air for combustion.

The piping P1 is provided with a valve V1. The valve V1 may be communicatively connected to the controller 90 by wire or wirelessly, and may be controlled by the controller 90. The controller 90 adjusts a flow rate of ammonia to the burner 11 by controlling an opening degree of the valve V1.

The piping P2 is provided with a valve V2. The valve V2 may be communicatively connected to the controller 90 by wire or wirelessly, and may be controlled by the controller 90. The controller 90 adjusts a flow rate of the second fuel to the burner 11 by controlling an opening degree of the valve V2.

As described above, in the present embodiment, the valves V1 and V2 function as an adjuster for adjusting the flow rate of ammonia and the flow rate of the second fuel to the plurality of burners 11. The adjuster is controlled by the controller 90 to adjust the flow rate of ammonia and the flow rate of the second fuel to the plurality of burners 11. In another embodiment, the adjuster may further include other components such as, for example, a flow meter or a pump. In still another embodiment, the adjuster may not include at least one of the plurality of valves V1 and the plurality of valves V2. For example, the adjuster may include at least one valve.

The plurality of burners 11, in particular the first burner 11a, the second burner 11b, and the third burner 11c that actually use ammonia as fuel, are arranged to face the first stage Ar1 to provide ammonia and the second fuel to the first stage Ar1, as described in detail later. Operations of the burners 11 are described in detail later.

The combustor 1 is connected to a plurality of pipes P4 for supplying dilution air to the second stage Ar2. For example, the plurality of pipes P4 may be arranged along a circumferential direction of the combustor 1. In another embodiment, instead of or in addition to the pipes P4, openings may be provided in the combustor 1 to supply the dilution air to the second stage Ar2.

The fuels supplied to the combustor 1 are burned in the first stage Ar1 and the second stage Ar2 in this order. Exhaust gas from the second stage Ar2 is fed to the turbine 2 and used for operation such as power generation.

The controller 90 controls the gas turbine 100 in whole or in part. The controller 90 includes, for example, a processor 90a, a memory 90b, and a connector 90c, and these components are connected to each other via buses. For example, the processor 90a includes a CPU (Central Processing Unit) or the like. For example, the memory 90b includes a hard disk, a ROM in which programs and the like are stored, and a RAM as a work area. The controller 90 is communicatively connected to each component of the gas turbine 100 by wire or wirelessly via the connector 90c. For example, the controller 90 may further include other components such as a display device, such as a liquid crystal display or a touch panel, and an input device, such as a keyboard, buttons or a touch panel. For example, operations of the controller 90 described later may be realized by executing programs stored in the memory 90b on the processor 90a.

Figure 3:
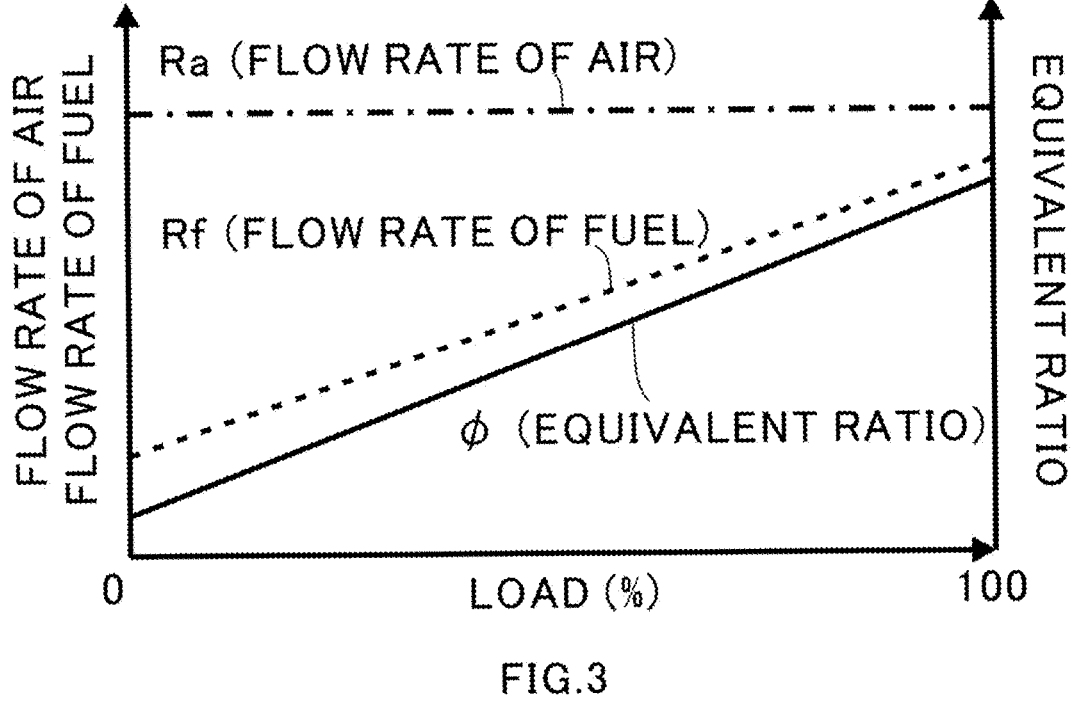
FIG. 3 is a diagram showing examples of transitions of a flow rate of air, a flow rate of fuel and an equivalent ratio, with respect to a load in a gas turbine.

FIG. 3 is a diagram showing examples of transitions of a flow rate of air, a flow rate of fuel and an equivalent ratio, with respect to a load in a gas turbine. In FIG. 3, a horizontal axis indicates the load (%) in the turbine, a left vertical axis indicates the flow rate of air and the flow rate of fuel, and a right vertical axis indicates the equivalent ratio. Furthermore, in FIG. 3, a solid line $\phi$ shows the equivalent ratio, a dashed line Rf shows the flow rate of fuel, and a dashed-dotted line Ra shows the flow rate of air.

In general, it is known that in a gas turbine using ammonia, it is possible to reduce occurrences of both NOx and unburned ammonia while using ammonia as fuel by burning ammonia at an equivalent ratio $\phi$ within a certain range, for example, between 1.1 and 1.4, in the first stage. Combustion of ammonia at the equivalent ratio in the above range can also reduce occurrences of $N_2O$, which has a high greenhouse effect. However, if, for example, ammonia is burned at an equivalent ratio $\phi$ lower than the above range, NOx will increase. Furthermore, for example, if ammonia is burned at an equivalent ratio higher than the above range, both NOx and unburned ammonia will increase. Note that the "equivalent ratio" is an index of concentration of fuel in an air-fuel mixture, and is a value obtained by dividing the stoichiometric air-fuel ratio, which means an air-fuel ratio at which fuel and oxygen in the air-fuel mixture react without excess or deficiency, by an actual air-fuel ratio. Furthermore, in the present disclosure, when ammonia and the second fuel are used as fuels at the same time, the "equivalent ratio" means the total equivalent ratio of ammonia and the second fuel.

However, as shown in FIG. 3, the flow rate of air Ra in a gas turbine may be substantially constant according to the area of openings of a combustor (e.g., the area of openings such as air holes), regardless of the load. In this case, as shown in FIG. 3, when the flow rate of fuel Rf varies depending on load, the equivalent ratio also varies.

Thus, for example, if a combustor is designed to have an equivalent ratio between 1.1 and 1.4 in a higher load range, the equivalent ratio may be lower than the above range in a lower load range. In this case, NOx will increase in the lower load range. In contrast, if a combustor is designed to have an equivalent ratio between 1.1 and 1.4 in a lower load range, the equivalent ratio may be higher than the above range in a higher load range. In this case, both NOx and unburned ammonia will increase in the higher load range.

In the present embodiment, the flow rate of ammonia and the flow rate of the second fuel in the plurality of burners 11 are adjusted to reduce occurrences of both NOx and unburned ammonia while using ammonia as fuel over a wider load range.

Next, specific operations of the burners 11 are described.

Figures 4A, 4B, 4C, 4D, 4E:
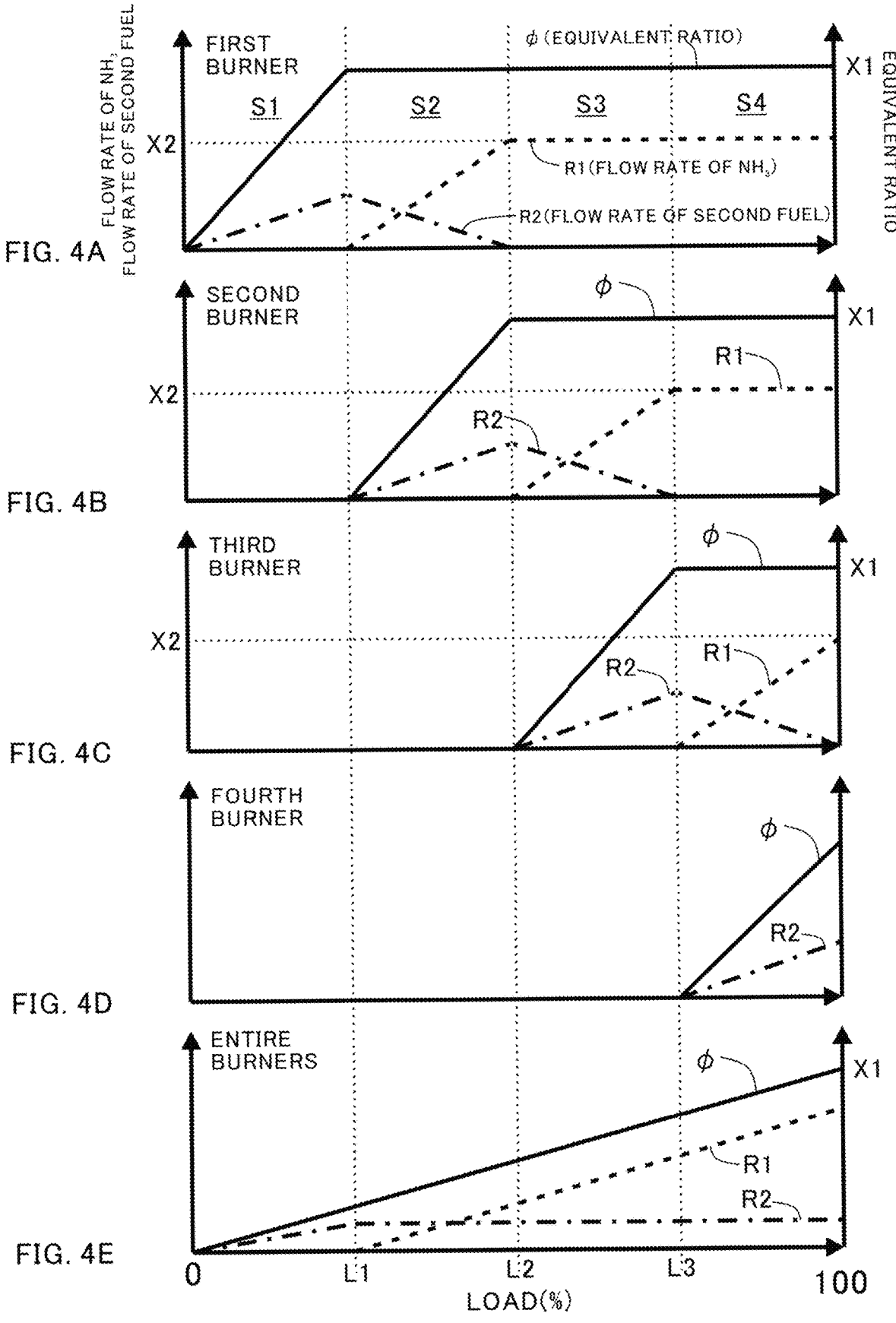
FIG. 4A shows an operation of a first burner.
FIG. 4B shows an operation of a second burner.
FIG. 4C shows an operation of a third burner.
FIG. 4D shows an operation of a fourth burner.
FIG. 4E shows an operation of a plurality of burners 11 as a whole.

FIGS. 4A through 4E are diagrams showing an example of an operation of each burner 11. As described above, in the present embodiment, the combustor 1 includes four burners 11. FIGS. 4A, 4B, 4C and 4D show operations of the first burner 11*a*, the second burner 11*b*, the third burner 11*c*, and the fourth burner 11*d*, respectively. Furthermore, FIG. 4E shows an operation of the plurality of burners 11 as a whole. In each of A, B, C, D and E, a horizontal axis indicates the load (%) in the gas turbine, a left vertical axis indicates the flow rate of ammonia ($NH_3$) and the flow rate of the second fuel, and a right vertical axis indicates the equivalent ratio. In each of A, B, C, D and E, a solid line $\phi$ shows the equivalent ratio, a dashed line R1 shows the flow rate of ammonia, and a dashed-dotted line R2 shows the flow rate of the second fuel.

The load is divided into several load ranges S1, S2, S3 and S4. For example, the number of load ranges may correspond to the number of burners 11. Thus, in the present embodiment, the load is divided into four load ranges S1, S2, S3 and S4.

For example, the first load range S1 is a region equal to or greater than zero and less than L1. The load L1 is greater than zero. For example, the load L1 can be a load when the equivalent ratio of the first burner 11*a* reaches a predetermined first value X1, as described later.

The second load range S2 is a region equal to or greater than L1 and less than L2. The load L2 is higher than the load L1. For example, the load L2 can be a load when the flow rate R1 of ammonia of the first burner 11*a* reaches a predetermined second value X2, as described later.

The third load range S3 is a region equal to or greater than L2 and less than L3. The load L3 is higher than the load L2 and less than 100. For example, the load L3 can be a load when the flow rate R1 of ammonia of the second burner 11*b* reaches the second value X2, as described later.

The fourth load range S4 is a region equal to or greater than L3 and equal to or less than 100.

In the following descriptions, each load range S1, S2, S3, S4 may simply be referred to as "range." In the following descriptions, the equivalent ratio $\phi$ may be estimated based on the flow rate R1 of ammonia and the flow rate R2 of the second fuel supplied to the burner 11, and the flow rate of air supplied to the burner 11.

In the present embodiment, FIG. 4A is described as R2=0 at 0% load and in the ranges S3 and S4, for better understanding. However, even in these ranges, a small amount of second fuel may be used to maintain a pilot flame. Also, a small amount of second fuel may be used at 0% load to maintain the rotation of the turbine 2. The same applies to regions where R2=0 in B, C and D.

Referring to FIG. 4A, in the range S1, the processor 90*a* controls the adjuster to supply the second fuel to the first burner 11*a*. For example, the processor 90*a* may control the adjuster so that the flow rate R2 of the second fuel increases linearly with respect to the load. As the flow rate R2 of the second fuel increases, the equivalent ratio also increases. In the range S1, ammonia is not supplied to the first burner 11*a*.

Referring to FIGS. 4B, 4C and 4D, in the range S1, ammonia and the second fuel are not supplied to the second burner 11*b*, the third burner 11*c* and the fourth burner 11*d*. A small amount of second fuel may be used to maintain a pilot flame for the second burner 11*b*, the third burner 11*c* and the fourth burner 11*d* in the range S1, as described above. Similar explanations are omitted below.

Referring to FIG. 4A, the equivalent ratio $\phi$ of the second fuel in the first burner 11*a* reaches the predetermined first value X1 at the load L1 (equivalent ratio $\phi$s of the second fuel=X1). In the first burner 11*a*, the flow rate of air (e.g., the area of openings) is defined so that the equivalent ratio $\phi$ of the second fuel reaches the first value X1 at the load L1 by a predetermined amount of second fuel. The first value X1 can be a value within a range in which occurrences of both NOx and unburned ammonia can be reduced when ammonia is burned, e.g., a value between 1.1 and 1.4. In other words, the first value X1 can be referred to as the optimum equivalent ratio. As such, an environment is created in the first burner 11*a* in which ammonia can be burned while reducing occurrences of both NOx and unburned ammonia, from the range S2 including the load L1.

Accordingly, in the range S2, the processor 90*a* controls the adjuster to increase the flow rate R1 of ammonia and decrease the flow rate R2 of the second fuel for the first burner 11*a* so that the total equivalent ratio $\phi$ of ammonia and the second fuel is maintained at the first value X1 (equivalent ratio $\phi$a of ammonia+equivalent ratio $\phi$s of the second fuel=$\phi$const (=X1)). For example, the processor 90*a* may control the adjuster so that the flow rate R1 of ammonia increases linearly and the flow rate R2 of the second fuel decreases linearly, with respect to the load.

Referring to FIG. 4B, in the range S2, the processor 90*a* controls the adjuster so as to start supplying excess second fuel that cannot be supplied to the first burner 11*a* to the second burner 11*b*. For example, the processor 90*a* may control the adjuster so that the flow rate R2 of the second fuel increases linearly with respect to the load.

Referring to FIGS. 4C and 4D, in the range S2, ammonia and the second fuel are not supplied to the third burner 11*c* and the fourth burner 11*d*.

Referring to FIG. 4A, the flow rate R1 of ammonia in the first burner 11*a* reaches the predetermined second value X2 at the load L2. The second value X2 may be the maximum flow rate of ammonia that can be supplied to one burner 11, for example, the value at which the equivalent ratio $\phi$ reaches the first value X1 by ammonia ($\phi$a=X1). In other words, the second value X2 can be referred to as an upper limit of the flow rate of ammonia supplied to the burner 11. Accordingly, the flow rate R1 of ammonia can no longer be increased in the first burner 11*a*. As such, the processor 90*a* controls the adjuster so that the flow rate R1 of ammonia is maintained at the second value X2 and the flow rate R2 of the second fuel is maintained at 0 in the first burner 11*a* from the range S3 including the load L2. When a small amount of second fuel is used to maintain the pilot flame, that amount is maintained.

Referring to FIG. 4B, the equivalent ratio $\phi$ of the second fuel of the second burner 11*b* also reaches the first value X1 at the load L2. In the second burner 11*b*, the flow rate of air (e.g., the area of openings) is defined so that the equivalent ratio $\phi$ of the second fuel reaches the first value X1 at the load L2 by the amount of excess second fuel from the first burner 11*a*. Accordingly, an environment is also created in the second burner 11*b* in which ammonia can be burned while reducing occurrences of both NOx and unburned ammonia, from the range S3 including the load L2.

Although the equivalent ratio $\phi$ of the second fuel in the second burner 11*b* reaches the first value X1 at the load L2 in FIG. 4B, the processor 90*a* may control the adjuster so that this equivalent ratio $\phi$ reaches the first value X1 at a load lower than the load L2. In this case, an environment is still created in the second burner 11*b* in which ammonia can be burned while reducing occurrences of both NOx and unburned ammonia, from the range S3.

Accordingly, in the range S3, the processor 90*a* controls the adjuster to increase the flow rate R1 of ammonia and decrease the flow rate R2 of the second fuel for the second burner 11b so that the total equivalent ratio φ of ammonia and the second fuel is maintained at the first value X1. For example, the processor 90a may control the adjuster so that the flow rate R1 of ammonia increases linearly and the flow rate R2 of the second fuel decreases linearly, with respect to the load.

Referring to FIG. 4C, in the range S3, the processor 90a controls the adjuster so as to start supplying excess second fuel that cannot be supplied to the second burner 11b to the third burner 11c. For example, the processor 90a may control the adjuster so that the flow rate R2 of the second fuel increases linearly with respect to the load.

Referring to FIG. 4D, in the range S3, ammonia and the second fuel are not supplied to the fourth burner 11d.

Referring to FIG. 4B, the flow rate R1 of ammonia in the second burner 11b also reaches the second value X2 at the load L3. Accordingly, the flow rate R1 of ammonia can no longer be increased in the second burner 11b. As such, the processor 90a controls the adjuster so that the flow rate R1 of ammonia is maintained at the second value X2 and the flow rate R2 of the second fuel is maintained at zero in the second burner 11b from the range S4 including the load L3. When a small amount of second fuel is used to maintain the pilot flame, that amount is maintained.

Referring to FIG. 4C, the equivalent ratio φ of the second fuel of the third burner 11c also reaches the first value X1 at the load L3. In the third burner 11c, the flow rate of air (e.g., the area of openings) is defined so that the equivalent ratio φ of the second fuel reaches the first value X1 at the load L3 by the amount of excess second fuel from the second burner 11b. Accordingly, an environment is also created in the third burner 11c in which ammonia can be burned while reducing occurrences of both NOx and unburned ammonia, from the range S4 including the load L3.

Although the equivalent ratio φ of the second fuel of the third burner 11c reaches the first value X1 at the load L3 in FIG. 4C, the processor 90a may control the adjuster so that this equivalent ratio φ reaches the first value X1 at a load lower than the load L3. In this case, an environment is still created in the third burner 11c in which ammonia can be burned while reducing occurrences of both NOx and unburned ammonia, from the range S4.

Accordingly, in the range S4, the processor 90a controls the adjuster to increase the flow rate R1 of ammonia and decrease the flow rate R2 of the second fuel for the third burner 11c so that the total equivalent ratio φ of ammonia and the second fuel is maintained at the first value X1. For example, the processor 90a may control the adjuster so that the flow rate R1 of ammonia increases linearly and the flow rate R2 of the second fuel decreases linearly, with respect to the load.

Referring to FIG. 4D, in the range S4, the processor 90a controls the adjuster so as to start supplying excess second fuel that cannot be supplied to the third burner 11c to the fourth burner 11d. For example, the processor 90a may control the adjuster so that the flow rate R2 of the second fuel increases linearly with respect to the load.

Referring to FIG. 4E, the equivalent ratio φ increases linearly from 0% load to 100% load when focusing on the entire burners 11, according to the above operations.

However, as shown in FIG. 4A, the equivalent ratio φ is maintained at the first value X1 which can reduce occurrences of both NOx and unburned ammonia in the ranges S2, S3 and S4 where ammonia is actually used (R1>0), when focusing on the single first burner 11a. Accordingly, the single first burner 11a can curb the increase of NOx caused by ammonia and reduce unburned ammonia in the ranges S2, S3 and S4 where ammonia is actually used.

Similarly, as shown in FIG. 4B, the equivalent ratio φ is maintained at the first value X1 in the ranges S3 and S4 where ammonia is actually used (R1>0), when focusing on the single second burner 11b. Accordingly, the single second burner 11b can curb the increase of NOx caused by ammonia and reduce unburned ammonia in the ranges S3 and S4 where ammonia is actually used.

Similarly, as shown in FIG. 4C, the equivalent ratio φ is maintained at the first value X1 in the range S4 where ammonia is actually used (R1>0), when focusing on the single third burner 11c. Accordingly, the single third burner 11c can curb the increase of NOx caused by ammonia and reduce unburned ammonia in the range S4 where ammonia is actually used.

As explained above, each of the first burner 11a, the second burner 11b and the third burner 11c can curb the increase of NOx caused by ammonia and reduce unburned ammonia in the regions where ammonia is actually used. Accordingly, the burners 11 as a whole can use ammonia as fuel while reducing occurrences of both NOx and unburned ammonia in most of the load ranges S2, S3 and S4.

Note that as shown in FIG. 4D, ammonia is not used as fuel in the fourth burner 11d. Furthermore, the equivalent ratio φ may or may not reach the first value X1 in the fourth burner 11d.

As described above, the combustor 1 of the gas turbine 100 of the present embodiment includes the plurality of burners 11 each of which is supplied with ammonia as the first fuel and the second fuel that does not contain N atoms and has better ignitability than that of ammonia, and a controller 90 that adjusts the flow rate R1 of ammonia and the flow rate R2 of the second fuel to the plurality of burners 11. Furthermore, the controller 90 is configured to execute: supplying the second fuel to at least the first burner 11a of the plurality of burners 11 in the first load range S1 including zero load; and, in the second load range S2 where the equivalent ratio φ of the first burner 11a reaches the predetermined first value X1, increasing the flow rate R1 of ammonia and decreasing the flow rate R2 of the second fuel for the first burner 11a so that the total equivalent ratio φ of ammonia and the second fuel of the first burner 11a is maintained at the first value X1, and supplying excess second fuel that is not supplied to the first burner 11a to the second burner 11b. According to such a configuration, the burner 11 whose equivalent ratio φ reaches the first value X1 within the range where occurrences of both NOx and unburned ammonia can be reduced starts to use ammonia. Therefore, in the ranges S2, S3 and S4 after the load L1, occurrences of both NOx and unburned ammonia can be reduced while using ammonia as fuel. Furthermore, N2O, which has a high greenhouse effect, can also be reduced.

Furthermore, in the combustor 1, the controller 90 is configured to execute: in the third load range S3 where the flow rate R1 of ammonia for the first burner 11a reaches the predetermined second value X2, increasing the flow rate R1 of ammonia and decreasing the flow rate R2 of the second fuel for the second burner 11b whose equivalent ratio φ has reached the first value X1 so that the total equivalent ratio of ammonia and the second fuel of the second burner 11b is maintained at the first value X1. According to such a configuration, the number of burners 11 using ammonia can be increased, depending on an increase in the load.

Although an embodiment of the present disclosure has been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

For example, in the above embodiment, the second fuel is not supplied to the second burner 11b, the third burner 11c and fourth burner 11d in the first load range S1. However, in another embodiment, the second fuel may also be supplied to the second burner 11b, the third burner 11c and the fourth burner 11d in the first load range S1. Note that ammonia can be used from a lower load when the second fuel is intensively supplied only to the first burner 11a in the first load range S1 as in the above embodiment, since the equivalent ratio $\phi$ reaches the first value X1 at a lower load.

The present disclosure can promote the use of ammonia to reduce $CO_2$ emissions, thus contributing to Sustainable Development Goals (SDGs), Goal 7 "Ensure access to affordable, reliable, sustainable and modern energy," for example.

What is claimed is:

1. A combustor using a two-stage combustion method, the combustor comprising:
   a first stage;
   a second stage positioned downstream of the first stage a plurality of burners, each of the plurality of burners is supplied with ammonia as a first fuel and a second fuel that does not contain N atoms and has better ignitability than the ammonia, the plurality of burners facing the first stage and providing the ammonia and the second fuel to the first stage; and a controller that respectively adjusts a flow rate of the ammonia and a flow rate of the second fuel to each of the plurality of burners, the controller being configured to execute:
   supplying the second fuel to at least a first burner of the plurality of burners in a first load range including zero load; and
   in a second load range where the equivalent ratio of the first burner reaches a predetermined equivalent ratio value, increasing the flow rate of the ammonia and decreasing the flow rate of the second fuel for the first burner, so that the equivalent ratio of the first burner is a total equivalent ratio of the ammonia and the second fuel in the first burner and is maintained at the predetermined equivalent ratio value, and supplying excess second fuel that is not supplied to the first burner to a second burner of the plurality of burners.

2. The combustor according to claim 1, wherein the controller is further configured to execute:
   in a third load range where the flow rate of the ammonia for the first burner reaches a predetermined flow rate value, increasing the flow rate of the ammonia and decreasing the flow rate of the second fuel for the second burner when the equivalent ratio of the second burner reaches the predetermined equivalent ratio value, so that the equivalent ratio of the second burner is a total equivalent ratio of the ammonia and the second fuel in the second burner and is maintained at the predetermined equivalent ratio value.

3. A gas turbine comprising the combustor according to claim 1.

* * * * *